2,234,436

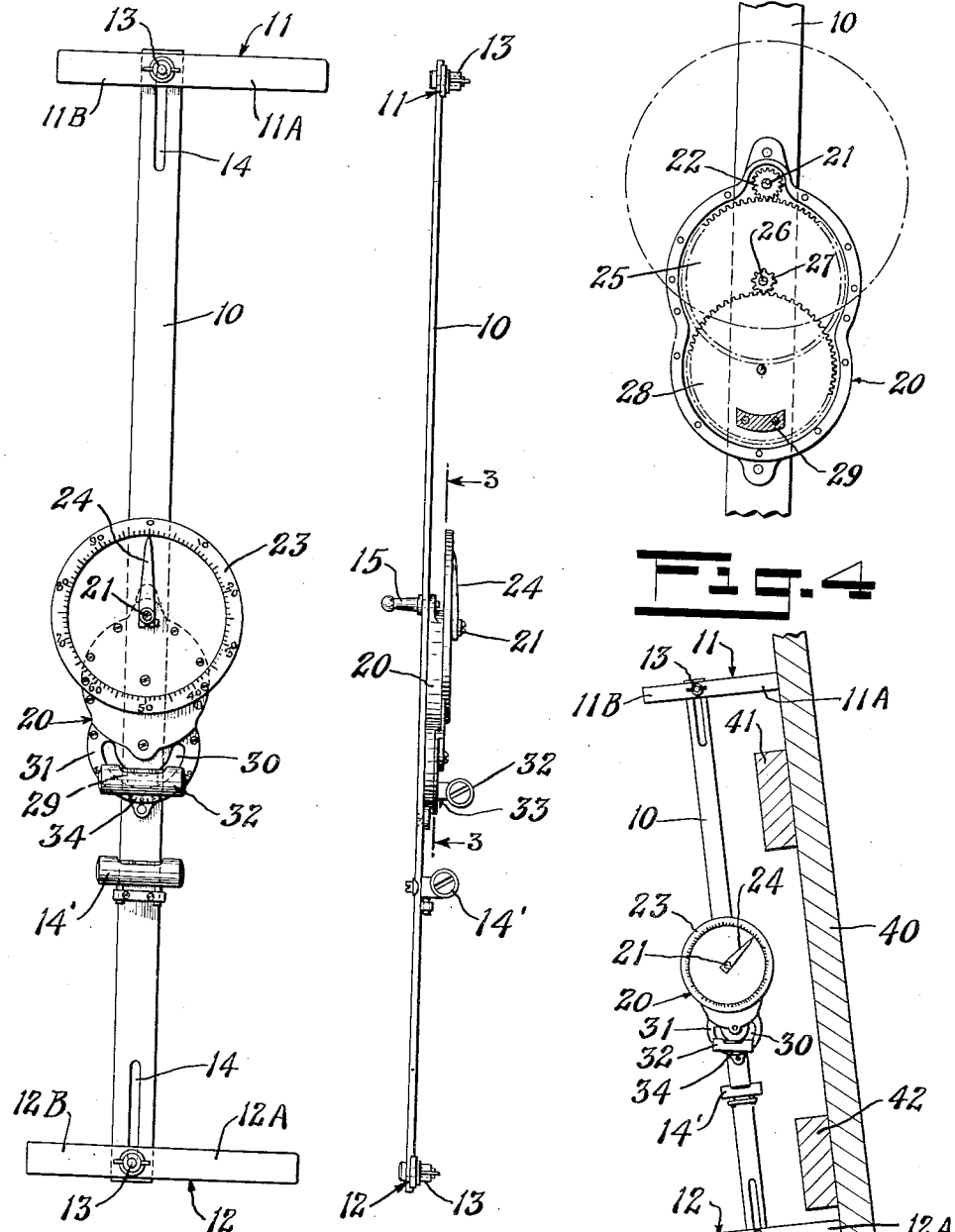
March 11, 1941.    B. W. KING    2,234,436
INCLINOMETER
Filed July 19, 1939
INVENTOR.
Bertell W. King
BY Marshall A. Hawley
ATTORNEYS Patented Mar. 11, 1941

UNITED STATES PATENT OFFICE 2,234,436

INCLINOMETER

Bertell W. King, Brooklyn, N. Y.

Application July 19, 1939, Serial No. 285,282

1 Claim. (Cl. 33—214)

This invention relates to improvements in inclinometers, and its object is to provide a simple device by means of which the inclination from the vertical to a slanting wall may be quickly and accurately measured.

More specifically, its object is to provide an instrument of this character which is particularly adaptable for measuring the inclination of the sides of a barge.

In the following specification I will describe an instrument which is made according to and embodies my invention, the novel features of which will be set forth in the appended claim.

Referring to the drawing,

Fig. 1 is a front elevation of a preferred form of instrument which embodies this invention;

Fig. 2 is a side elevation of the device shown in Fig. 1;

Fig. 3 is a sectional front elevation on a larger scale of a gearing mechanism which forms a part of the instrument. The section in this figure is taken on the line 3—3 of Fig. 2; and Fig. 4 is a side elevation on a smaller scale of the instrument in use.

10 designates a bar of considerable length on which the other parts of the device are supported. Near its ends are transverse grooves for receiving transverse arms 11 and 12 which are secured in the transverse grooves by bolt and wing-nut combinations 13. These bolts pass through longitudinal slots 14 in the bar 10 so that when loosened and the arms removed from the transverse grooves, they may be moved in the slots to permit the arms 11 and 12 to be rotated into alinement with the bar for convenience in transportation. The parts 11A and 12A of the arms are of exactly the same length as are also the parts 11B and 12B. 14' is an ordinary spirit level affixed transversely to the bar 10.

Affixed to the bar 10 intermediate its ends is a casing 20. A handle 15 projects from the opposite side of the bar. Supported in the casing is a pinion shaft 21 to which is affixed the pinion 22, (Fig. 3). The shaft 21 extends through a graduated dial 23 which is affixed to the casing and an actuating pointer 24 is affixed to shaft 21 in front of the dial.

The pinion 22 is in mesh with a gear 25 on a shaft 26 on which is also a pinion 27. The gear 25 and pinion 27 are fast on shaft 26 so that these parts rotate together. Pinion 27 is in mesh with a gear 28 on which is a level support 29 which extends through a slot 30 in the cover 31 for the casing 20.

32 is an extremely sensitive spirit level mounted on the support 29. A pointer 33 extends from the center of the level 32 to cooperate with a scale 34 on the casing cover 31.

In Fig. 4, 40 designates a structure of which the inclination is to be measured. If such a structure is the side of a barge, it is likely to have obstructions on its inner surface, such as stringers 41, 42. The bar 10 is held in a position with the arms 11 and 12 in substantially vertical position. Similar ends of the arms 11 and 12 are held against the surface of which the inclination is to be measured. The portions 11B and 12B may be of sufficient length to clear the obstructions 41, 42, or if greater length is required, the portions 11A and 12A may be used. The bar 10 will then be parallel with the surface of the structure 40. The actuating pointer is now moved to bring the level 32 into a level position. The dial 23 is divided into one hundred graduations and the ratio of the train of gearing between the pointer 24 and the level 32 is such that one revolution of the pointer corresponds to an inclination of one foot from the vertical in ten of vertical height. Thus, if a movement of the pointer 24 of one graduation on the dial 23 is sufficient to bring level 32 to a level position, the inclination is one one-hundredth of a foot in ten feet of boat height. Each complete revolution of the actuating pointer 24 moves the level pointer 33 one degree on the scale 34. Therefore, if the actuating pointer has been given two complete revolutions and to the point marked 15 on the dial 23, the inclination measured will be indicated as two feet and fifteen hundredths of a foot in ten feet of boat height.

Such measurements are extremely accurate and may be made easily and rapidly. By the use of this instrument inclination readings may be read easily by daylight or flashlight and with micrometer precision.

Structural modifications may be made within the spirit and scope of this invention and I intend no limitations other than those indicated by the following claim.

What I claim is:

An inclinometer comprising an elongated bar, arms pivotally connected to said bar near its ends arranged to be positioned transversely to the bar to form abutment members adapted to be held in substantially vertical alinement in one plane against a surface of which the inclination is to be measured, said arms when in transverse position projecting an equal distance from one side of the bar and a different equal distance from the other side of the bar, a handle affixed to the bar intermediate its ends projecting from the bar at right angles to said arms, a mechanism supported by said bar comprising a graduated dial, an actuating pointer associated with said dial, an adjustable level, reducing gearing between the actuating pointer and the adjustable level, a pointer movable with the adjustable level, and a graduated scale associated with the level pointer.

BERTELL W. KING.